United States Patent [19]

Ohtani et al.

[11] 4,097,383
[45] Jun. 27, 1978

[54] PROCESS FOR PRODUCTION OF MICROPOROUS SHEET

[75] Inventors: Sumio Ohtani; Nobuo Hiratsuka; Masaru Horiguchi, all of Minami Ashigara, Japan

[73] Assignee: Fuji Photo Film Co., Ltd., Minami Ashigara, Japan

[21] Appl. No.: 777,481

[22] Filed: Mar. 14, 1977

Related U.S. Application Data

[63] Continuation of Ser. No. 581,062, May 27, 1975, abandoned.

[30] Foreign Application Priority Data

May 24, 1974 Japan .................................. 49-58472

[51] Int. Cl.² .................... B01D 39/14; B32B 31/18
[52] U.S. Cl. ............................. 210/500 M; 156/246; 156/254; 156/344; 210/490; 264/DIG. 47; 264/DIG. 48; 427/245; 428/305

[58] Field of Search ............... 156/254, 248, 247, 234, 156/246, 344; 264/139, 48, DIG. 48, DIG. 47, 158; 428/304, 305, 320; 210/500 R, 500 M, 503, 506, 510, 490; 427/244, 245

[56] References Cited

U.S. PATENT DOCUMENTS

| 2,732,324 | 1/1956 | Morris | 156/254 |
| 3,174,889 | 3/1965 | Anderson et al. | 156/254 |
| 3,565,982 | 2/1971 | Day | 428/304 X |
| 3,690,985 | 9/1972 | Price | 156/254 |

*Primary Examiner*—Douglas J. Drummond
*Assistant Examiner*—M. G. Wityshyn
*Attorney, Agent, or Firm*—Sughrue, Rothwell, Mion, Zinn and Macpeak

[57] ABSTRACT

A process for producing a microporous sheet comprising peeling off a microporous sheet of a resin bonded to a plate from the plate in such a manner that the microporous sheet is split into two sheets.

23 Claims, 6 Drawing Figures

PROCESS FOR PRODUCTION OF MICROPOROUS SHEET

This is a continuation of application Ser. No. 581,062, filed May 27, 1975, now abandoned.

BACKGROUND OF THE INVENTION

1. Field of the Invention

The present invention relates to a process for producing a microporous sheet. More particularly, the present invention relates to a process for producing a microporous sheet for filtration which permits the flow of a large amount of a fluid.

2. Description of the Prior Art

A microporous sheet, i.e., a sheet containing fine pores in one surface thereof is well known (e.g., C. Gelman et al, Anal. Chem., 37 (6) 29 A (1965)), and widely used as a filter and the like.

In general, a microporous sheet is produced mainly from a cellulose ester, a cellulose ether, regenerated cellulose, polyvinyl chloride, polyacrylonitrile, polyamide, alginate, gelatin, or the like, as described in U.S. Pat. Nos. 1,421,341, 3,133,132, 2,944,017, 2,783,894, Japanese Patent Publication Nos. 15698/1968, 33313/1970, 39586/1973, 40050/1973, Sartorius Membrane Catalog (1970), Gelman Catalog (1969), etc. The pore size of the fire pores in microporous sheets produced by prior art techniques generally ranges from about 0.01 $\mu$ to about 8 $\mu$, and this range is practical for use in filtration. That is, the features of the so-called membrane filter reside in that the pore size is generally uniform as compared with other filters, the porosity is high, and the filtration resistance is low.

However, conventional membrane filters have the disadvantages that the amount of particles retained is small and the pores of the filters become rapidly packed since the filters separate the particles only on the surfaces thereof.

Thus microporous sheets have been desired which retain a large amount of particles, permit the flow of a large amount of a fluid, and whose pores become packed slowly.

As a result of investigations on these microporous sheets, it has been now been found that in hitherto produced membrane filters, the pore size changes discontinuously in the thickness direction of the sheet. That is, when a membrane filter is produced by the above described prior art technique, the pore size of the filter obtained changes continuously in a trumpet-shaped form in the thickness direction. For example, FIG. 1 is a sectional view of a conventional membrane filter in which the hatched areas indicate the non-pore areas. In the conventional membrane filter the pore size at Surface B is about 1 to 2 times larger than the pore size at Surface A and the pore size at the inner portion of the filter is about 2 to 100 times larger than that at Surface A.

Therefore, it can be seen that the pores become packed with particles at the narrow portions of the filter, i.e., at the surface thereof regardless of whether the fluid is passed from either Surface A or Surface B. As a result of recent investigations based upon these findings, it has been further found that a microporous sheet containing the pores in the form of a trapezoid can be quite conveniently produced by splitting a microporous sheet along a plane perpendicular to the thickness direction of the sheet.

SUMMARY OF THE INVENTION

An object of the present invention is to provide a process for the production of a microporous sheet which retains a large amount of particles, permits the flow of a large amount of a fluid, and whose pores do not become packed rapidly with particles.

The object can be attained by peeling off a microporous sheet comprising a solvent-soluble resin bonded to a plate from the plate in such a manner that the microporous sheet is split into two sheets along a plane perpendicular to the thickness direction of the sheet.

DETAILED DESCRIPTION OF THE INVENTION

Figure 1:
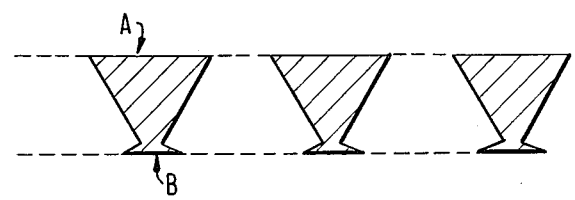
FIG. 1 is an enlarged sectional view of a microporous sheet produced by a conventional method.

The separation of a microporous sheet along a plane perpendicular to the thickness direction into two sheets can be achieved either by bonding the microporous sheet onto a plate to which the microporous sheet adheres quite well, and then peeling off the microporous sheet, or by casting a polymer solution on a plate having good adhesivity to form the microporous sheet on the plate, and then peeling off the microporous sheet so produced. Thus the term "bond" as used herein designates the state that the microporous sheet adheres, coheres, or attaches onto the plate temporarily.

As the plate, any of those plates which have smooth surfaces and are capable of supporting the microporous sheet, preferably without any separation between the plate and the microporous sheet, can be used. These supports include glass plates, metal plates, sheets of synthetic resins such as polyvinyl chloride, polyvinylidene chloride, polystyrene, polymethacrylates, polyacrylamides, polyethylene, polypropylene, polyamides, polycarbonates, cellulose esters, polyesters, and the like, and paper, and the laminates thereof. From the standpoint of operation, a flexible sheet is particularly preferably used.

Methods for improving the adhesion of the plate to the microporous sheet can be divided roughly into two groups. One method is a physical or chemical treatment, or a combination thereof, and the other method is the coating of an adhesive on the support, or a combination of the above treatment and a coating of an adhesive on the support.

The former method is mainly employed with synthetic resin sheets and includes corona discharge, UV irradiation, washing with an alkali or acid, etc., as described in U.S. Pat. Nos. 2,943,937, 3,475,193, 3,615,557, 3,590,107, British Pat. No. 1,215,234. The latter method is a practical method which can be widely used regardless of the kind of support. These methods are well known in the field of a synthetic resin sheets.

The adhesive as used herein can be any of those which can sufficiently bond the plate and the microporous sheet. These adhesives include starch, dextrin, gelatin, polyvinyl acetate, cellulose esters, melamine condensates, epoxy resins, polyvinyl alcohol, neoprene rubber, silicone rubber, polyesters, and the like. Although the adhesive used changes depending upon the kind of the support and the material of the microporous sheet, a suitable adhesive can be easily selected by one skilled in the art through simple routine experiments.

On the other hand, the microporous sheet which is produced directly or using an adhesive on the support can be easily produced by casting or coating a polymer solution according to the prior art technique. Polymer solutions and various operations used in the production of the microporous sheet are described in the above described patents, and U.S. Pat. Nos. 3,129,159, 3,428,584, etc.

The hitherto known binders, additives, and methods such as casting, drying, and the like can be also conveniently utilized in the present invention, e.g., as described in U.S. Pat. No. 3,547,809 and Japanese Pat. No. 40,050/73.

The microporous sheet thus formed on or bonded to the support can suitably have pores of a size of about 0.01 to 10 $\mu$ on either surface thereof and pores of a size of about 0.1 to 8 $\mu$ are preferred. The pores in the interior of the microporous sheet will in general range from about 2 to 100 times larger than those pores on the surfaces.

The microporous sheet bonded onto the support as described above is peelled off of the support. The peeling step in the method of the present invention is important in obtaining a membrane filter containing relatively large pores. However the peeling operation is not particularly limited. The simplest peeling operation comprises bending the support or the microporous sheet at an acute angle with each other to provide a strain based upon the difference in the radius of curvature between the support and the microporous sheet. If the adhesive strength between the support and the microporous sheet is sufficient, the microporous sheet is subject to an internal cleavage, thereby resulting in a splitting of the sheet into two sheets along a plane at a right angle to the thickness direction. This is considered to be due to the fact that the part with a large pore size inside the microporous sheet is thin and weak in strength.

The present invention will be further explained by reference to the accompanying drawings.

Figure 2:
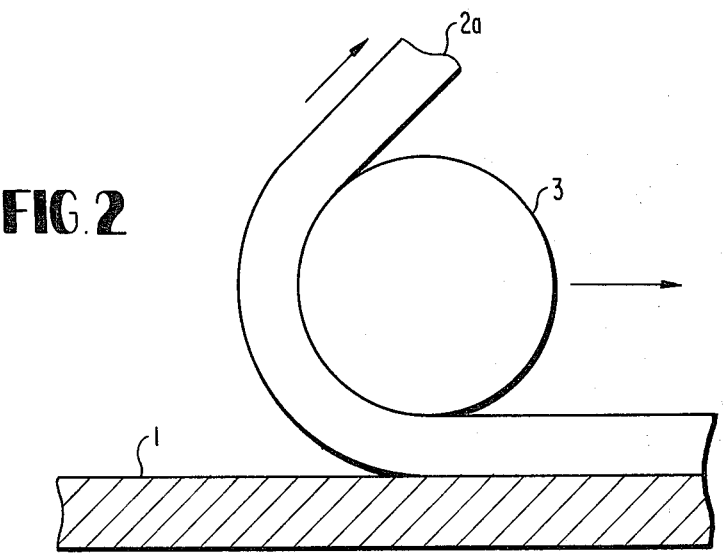
FIGS. 2 to 4 are sectional views of embodiments of the present invention showing the peeling operation.
Figure 4:
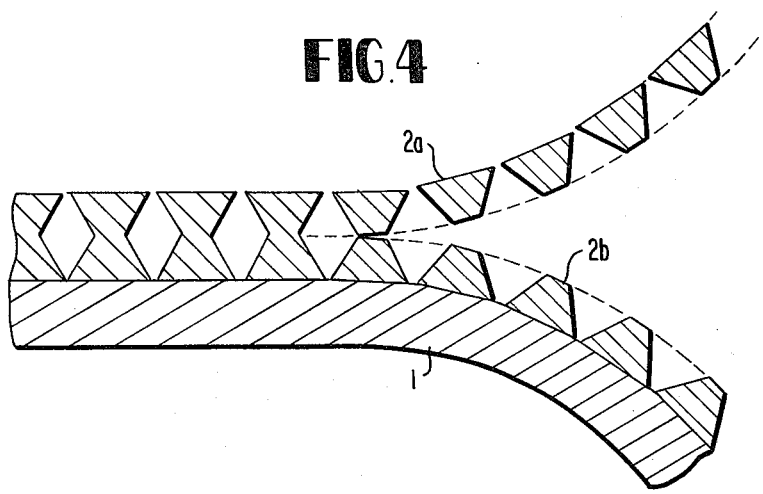
Figure 3:
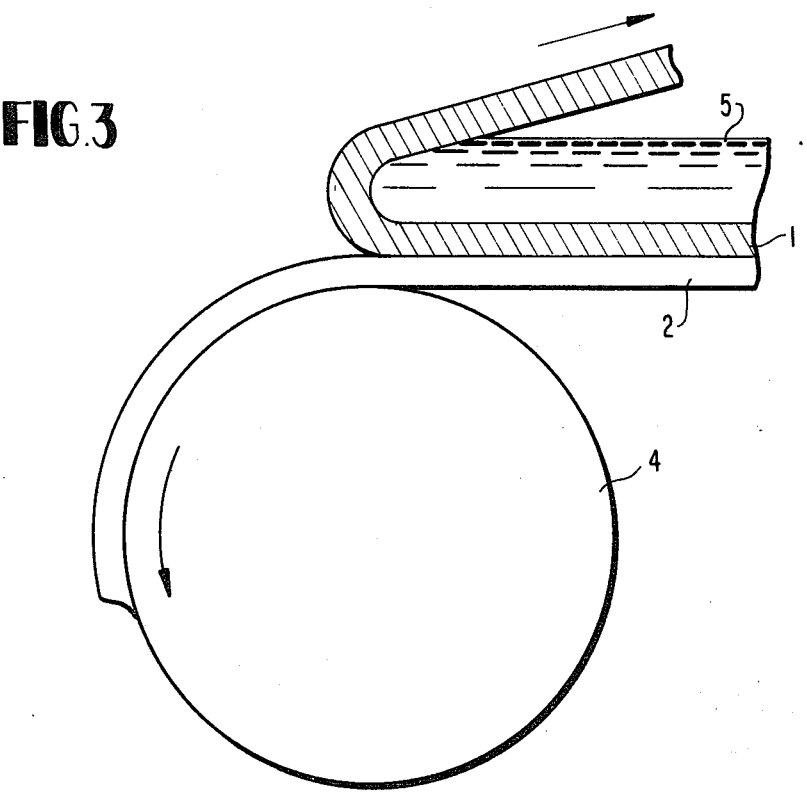

FIGS. 2 to 4 show embodiments of peeling off the microporous sheet in accordance with the method of the present invention.

In FIG. 2, the microporous sheet 2 bonded to the plate 1 is peeled off by bending using a roller 3.

In FIG. 3, the microporous sheet 2 is peeled off from the plate 1 by bending the microporous sheet using a suction drum 4, and by bending the plate using a peeling bar 5.

In FIG. 4, the microporous sheet 2 bonded to the plate 1 is separated at the position where the inner pore size is large, into a microporous sheet (article) 2a and a microporous sheet (non-article) 2b. The microporous sheet 2b becomes a microporous sheet (article) 2a when peeled off from the plate 1, but it can be discarded as it is.

Figure 5:
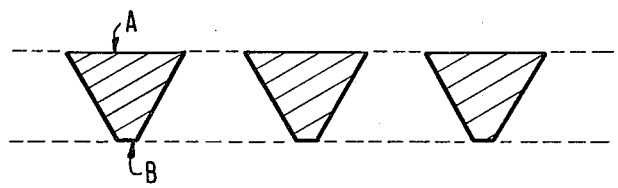
FIG. 5 is an enalarged sectional view showing the surface of a microporous sheet produced by the method of the present invention.

With the thus produced microporous sheet, as shown in FIG. 5, the ratio of the pore size at Surface A to that at Surface B can be made about 1:2 to 1:100, preferably 1:4 to 1:100. When the microporous sheet is used for filtration, the layer containing the pores which are large in the pore size acts as a prefilter to separate relatively coarse particles in the mother liquor and the layer containing the pores which are small in the pore size acts to separate much smaller particles, and thus the packing of the filter is delayed and the amount of the fluid which can be passed is increased up to about 1.5 to 5 times larger than the amount which can be passed through a conventional filter.

Figure 6:
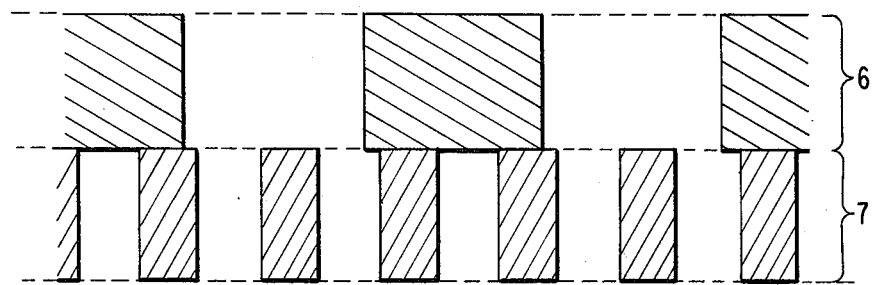
FIG. 6 is a sectional view of a conventional microporous sheet provided with a pre-filter.

On the other hand, with a membrane filter having a prefilter on one side of a filter paper or filter cloth produced by the method as described in Japanese Patent Publication No. 19217/1973, as shown in FIG. 6, a microporous member (prefilter) 6 is provided with a layer (membrane filter) 7 containing a large number of fine pores, and thus a portion of the fine pores of the membrane filter 7 becomes packed with the particles on the surface of the prefilter 6. Therefore, with the filter as shown in FIG. 6, the filtration rate is decreased to about 30 to 40% as compared with the case where the membrane filter is used alone.

The microporous sheet produced by the method of the present invention is substantially a single element and the pore shape changes continuously in the form of a trapezoid in the direction of the thickness of the layer. Thus, since the pores, which are contained in the prefilter and which are large in pore size, are continuously connected to the pores, which are contained in the memberane filter and which are small in the pore size, all of the fine pores pass through the filter from the surface to the opposite surface. Therefore, with the microporous sheet of the the present invention, the filtration rate is substantially the same as that of a microporous sheet produced by the conventional method, and the packing is slow and the amount which can be filtered is large.

That is, since the microporous sheet produced by the method of the present invention has an excellent capability for retaining the particles and is slow to be packed at the time of filtration, the microporous sheet is capable of being used to filter a large amount of the fluid. Thus, the microporous sheet produced by the method of the present invention can be used for general cleaning and filtration, for the removal of bacteria and stabilization of liquidous foodstuffs such as beer, wine, sake, juice, and the like, the purification of air, the complete removal of bacteria from pharmaceuticals, the ultrafiltration of proteins, the filtration of photoresist solutions, the detection and analysis of bacteria, the inspection of waste water, and the like, and further it can be used as a membrane for electrophoresis and as a reverse osmosis membrane.

The present invention will be explained in greater detail by reference to the following examples. All parts, percents, ratios and the like are by weight unless otherwise indicated.

EXAMPLE 1

| Composition 1 | Parts |
|---|---|
| Cellulose Acetate (degree of acetylation: 39.6) | 6 |
| Glycerin | 1 |
| Methylene Chloride | 54 |
| Methanol | 35 |
| Water | 5 |

The above components were mixed to produce a uniform solution, which was divided into two portions.

One of these portions was cast onto a stainless steel plate which was coated with nitrocellulose as an adhesive in a thickness of about 1 μ (method of the present invention), and the other portion was cast onto a stainless steel plate which was not subjected to any treatment (conventional method). The thus coated stainless steel plates were dried at room temperature (i.e., 20° to 30° C) for 2 hours and then at 80° C for 30 minutes, and thus microporous sheets having a film thickness of about 120 μ were formed on the stainless steel plates. Then the microporous sheets were peeled off in the same manner as shown in FIG. 2.

The microporous sheet produced by the method of the present invention was peeled off, as shown in FIG. 4, leaving a part of the microporous sheet having a thickness of about 10 μ on the plate 1. At this time, the volatile content of the sheet was 0.5%. The properties of the thus obtained microporous sheet are shown hereinafter.

EXAMPLE 2

Microporous sheets were produced by the same method as used in Example 1. The microporous sheets were saponified at 23° C for about one hour using a 1N NaOH aqueous solution, washed with water, and dried to produce microporous sheets of regenerated cellulose. In each case, the degree of acetylation was about 0.4.

EXAMPLE 3

| Composition 2 | Parts |
| --- | --- |
| Nitrocellulose | 15 |
| Methyl Formate | 44 |
| Ethanol | 33 |
| Water | 7 |
| Polyoxyethylene Octylphenyl Ether | 1 |

The above components were mixed to produce a uniform solution, which was then divided into two portions.

One of these portions was cast onto a glass plate which was coated with cellulose acetate in a thickness of about 0.5 μ, and the other portion was cast onto a glass plate which was not subjected to any treatment. The thus coated glass plates were dried at room temperature for one hour to produce microporous sheets having a thickness of about 160 μ thereon. The microporous sheets so produced were peeled off from the glass plates using the method as shown in FIG. 2.

The microporous sheet produced by the method of the present invention provided a microporous sheet having a thickness of about 130 μ. At this time, the volatile content of the microporous sheet so obtained was 25% , and the volatile content was reduced below 1% by heating at 100° C for one hour.

EXAMPLE 4

| Composition 3 | Parts |
| --- | --- |
| Alcohol-soluble Nylon (CM 4000, trade name, produced by Toray Industries, Ltd.) | 16 |
| Methanol | 50 |
| Water | 23 |
| Dioxane | 10 |

The above components were mixed to produce a uniform solution, which was then divided into two portions. One of these portions was cast onto a polyethylene terephthalate (PET) sheet which was coated with a vinyl acetate resin, and the other portion was cast on an untreated PET sheet. The thus coated PET sheets were dried at 23° C for 5 hours and then at 90° C for 40 minutes to form microporous sheets having a thickness of about 200 μ thereon. The microporous sheets so produced were peeled off by the use of a suction drum and a peeling bar as shown in FIG. 3 and thus microporous sheets having a thickness of about 120 μ were obtained. In the former microporous sheet, a part of the microporous sheet remained on the plate as shown in FIG. 4.

EXAMPLE 5

A microporous sheet of polyvinyl chloride was produced on an untreated glass plate, and the microporous sheet so produced was divided into two sheets. One the side of one of the sheets which had been in contact with the glass plate, an adhesive tape was bonded and then peeled off. The surface layer which was bonded to the tape was also peeled off.

The properties of the sheets as produced in each of the above examples are shown in Table 1 below.

Table 1

|  | Example 1 | | Example 2 | | Example 3 | | Example 4 | | Example 5 | |
| --- | --- | --- | --- | --- | --- | --- | --- | --- | --- | --- |
|  | A[1] | B[2] | A | B | A | B | A | B | A | B |
| Pore Size (μ)[3] | 0.5 | 0.5 | 0.4 | 0.4 | 0.8 | 0.8 | 1.0 | 1.0 | 0.6 | 0.6 |
| Initial Filtration Rate[4] | 90 | 50 | 60 | 40 | 60 | 50 | 60 | 40 | 50 | 35 |
| Average Filtration Rate[5] | 30 | 6 | 20 | 5 | 16 | 9 | 29 | 14 | 17 | 8 |

[1] A Produced by the method of the present invention
[2] B Produced by the conventional method
[3] Pore Size Average pore size on the side which was not in contact with the plate, measured by the mercury injection method.
[4] Initial Filtration Rate Filtration amount (ml/cm$^2$/min) during the initial one minute of filtration of beer which had not been subjected to any filtration treatment after fermentation and filtered under a pressure of 1 Kg/cm$^2$.
[5] Average Filtration Rate Average filtration amount (ml/cm$^2$/min) over a 20 minute using beer which had not been subjected to any filtration treatment after fermentation as described above under a pressure of 1 Kg/cm$^2$.

While the invention has been described in detail and with reference to specific embodiments thereof, it will be apparent to one skilled in the art that various changes and modifications can be made therein without departing from the spirit and scope thereof.

What is claimed:

1. A microporous membrane filter produced by the steps consisting of bonding a microporous sheet directly to a plate, said microporous sheet having larger pores at its interior than at either of its original surfaces and; splitting the sheet along a plane perpendicular to the thickness direction of the sheet by a peeling operation into two microporous membrane sheets, wherein one sheet is retained on said plate and the other sheet is peeled from the retained sheet and; removing the retained sheet from the plate, said filter being either the peeled microporous membrane sheet or the microporous membrane sheet removed from said plate, said filter having a pore size at its peeled surface larger than the pore size at its original surface.

2. The microporous membrane filter of claim 1 wherein the ratio of the pore size at the peeled surface of said filter to the original surface is 1:2 to 1:100.

3. The microporous membrane filter of claim 1 wherein the peeling operation is performed by bending the microporous sheet.

4. The microporous membrane filter of claim 1 wherein said filter is comprised of at least one of the resins selected from the group consisting of cellulose ester, cellulose ether, regenerated cellulose, polyvinyl chloride, polyacrylonitrile, polyamide, alginate and gelatin.

5. The microporous membrane filter of claim 4 wherein the cellulose ester is cellulose acetate or nitro cellulose.

6. The microporous membrane filter of claim 4 wherein the regenerated cellulose is saponified cellulose.

7. The microporous membrane filter of claim 4 wherein the polyamide is nylon.

8. The microporous membrane filter of claim 4 wherein the resin is polyvinyl chloride.

9. A process for producing a microporous membrane filter which consists of
bonding a microporous sheet directly to a plate said sheet having larger pores at its interior than at either of its original surfaces; splitting the sheet along a plane perpendicular to the thickness direction of the sheet by a peeling operation into two microporous membrane sheets, wherein one sheet is retained on said plate and the other sheet is peeled from the retained sheet, said sheet peeled from the retained sheet having larger pores at the surface formed by peeling than at the opposite original surface and being suitable for use as a microporous membrane filter.

10. The process according to claim 9, wherein the peeling operation is performed by bending the microporous sheet.

11. The process according to claim 9, wherein the plate is a glass plate, a metal plate, a synthetic resin plate, paper, or a laminate of either a glass plate or a metal plate bonded to either a synthetic resin or paper.

12. The process according to claim 11, wherein the synthetic resin plate is polyvinyl chloride, polyvinylidene chloride, polystyrene, polymethacrylates, polyacrylamides, polyethylene, polypropylene, polyamide, polycarbonates, cellulose esters or polyesters.

13. The process according to claim 9, wherein the bonding of the microporous sheet to the plate is by casting a solution of the resin forming the microporous sheet on the plate and drying the resin layer.

14. The process according to claim 13, wherein the plate is previously coated with an adhesive at the side adjacent said microporous sheet.

15. The process according to claim 14, wherein the adhesive is selected from the group consisting of starch, dextrin, gelatin, polyvinyl acetate, cellulose esters, melamine condensates, epoxy resins, polyvinyl alcohol, neoprene rubber, silicone rubber and polyesters.

16. The process according to claim 9, wherein the microporous membrane filter is comprised of at least one of the resins selected from the group consisting of cellulose ester, cellulose ether, regenerated cellulose, polyvinyl chloride, polyacrylonitrile, polyamide, alginate and gelatin.

17. The process according to claim 16, wherein the cellulose ester is cellulose acetate or nitrocellulose.

18. The process according to claim 16, wherein the regenerated cellulose is saponified cellulose.

19. The process according to claim 16, wherein the polyamide is nylon.

20. The process according to claim 16, wherein the resin is polyvinyl chloride.

21. The process of claim 9, wherein the peeling operation is performed by bending the plate.

22. The process of claim 9, wherein the ratio of the pore size of the original surface of said unpeeled sheet to the pore size at the interior of said sheet is 1:2 to 1:100 and after peeling the ratio of the pore size at said original surface to the pore size at said peeled surface is 1:2 to 1:100.

23. The process of claim 9, wherein the pore size of said microporous sheet ranges from about $0.01\mu$ to about $8\mu$.

* * * * *